United States Patent Office 3,530,181
Patented Sept. 22, 1970

3,530,181
HERBICIDAL BENZAMIDES
Samuel B. Soloway, Sittingbourne, Kent, England, and Jerome G. Kuderna, Modesto, Calif., assignors to Shell Oil Company, New York, N.Y., a corporation of Delaware
No Drawing. Filed Feb. 3, 1965, Ser. No. 430,195
Int. Cl. C07c *103/76*
U.S. Cl. 260—558    7 Claims

ABSTRACT OF THE DISCLOSURE 2-nitrobenzamides containing chlorine, bromine, trifluoromethyl or sulfonyls substituted on the phenyl ring, useful as herbicides.

---

This invention relates to novel compounds useful in destroying and/or preventing growth of unwanted plants. In particular, this invention relates to novel 2-mononuclear substituted-nitro, alkyl and alkoxy benzamides found to be very active herbicides.

In modern agricultural practice hand weeding of unwanted plant growth has become almost obsolete. In most areas sufficient manpower is not available and when available the control of weeds by hand pulling or cultivating is inefficient, non-permanent and expensive. The use of effective chemicals to control weeds has long been a goal of the agricultural chemical industry. A new class of highly effective herbicides has now been discovered and this invention is directed to these novel compounds, to their use as herbicides and to herbicidal formulations containing these novel compounds. This invention provides a class of highly effective herbicides useful to control unwanted vegetation.

The compounds of the invention are represented by the generic formula:

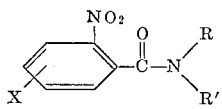

wherein R is hydrogen, alkyl of one of three carbon atoms, or alkoxy of one to three carbon atoms; R' is alkyl of one to three carbon atoms or alkoxy of one to three carbon atoms; X is middle halogen (chlorine or bromine), a group represented by R''S(O)$_n$ where R'' is alkyl of one to three carbon atoms and $n=0$ to 2, or trifluoromethyl, the X substitution being in either the 4- or 6-position on the phenyl ring.

A preferred subclass of compounds of the invention is that represented by the formula:

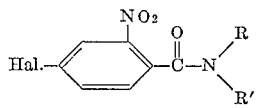

wherein "Hal" is chlorine or bromine and R and R' each independently represent alkyl or alkoxy of 1 to 3 carbon atoms—that is R and R' can be the same or can be different. Such compounds are preferred because of their outstanding herbicidal qualities. Typical members of this group include 4-chloro-2-nitro-N,N-dimethyl benzamide, 4-chloro-2-nitro-N,N-diethyl benzamide, 4-chloro-2-nitro-N,N-disopropyl benzamide, 4-chloro-2-nitro-N-methoxy-N-methyl benzamide and 4-bromo-2-nitro-N,N-dimethyl benzamide.

Particularly preferred because of their excellent physical properties and effectiveness as herbicides are compounds of the formula:

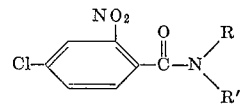

where R and R' are as previously discribed. Such effective herbiciles include 4-chloro-2-nitro-N,N-dimethyl benzamide, and 4-chloro-2-nitro-N-methoxy-N-methyl benzamide among others.

The 6-halo-2-nitrophenyl benzamides are also effective herbiciles and are compounds of the formula:

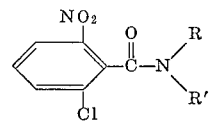

wherein R and R' are as previously described. Such an effective herbicide is typified by 6-chloro-2-nitro-N,N-dimethyl benzamide.

Expecially preferred because of its outstanding effectiveness on a large number of economically important weeds is 4-chloro-2-nitro-N,N-dimethyl benzamide.

A further preferred subclass of highly active benzamides of the invention are those compounds represented by the formula:

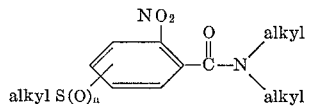

wherein alkyl contains 1 to 3 carbon atoms and $n=0$–2. Exemplary of such compounds are 4-methylthio-2-nitro-N,N-dimethyl benzamide, 4-methylsulfonyl-2-nitro-N,N-dimethyl benzamide, 4-methylsulfonyl-2-nitro-N,N-diethyl benzamide, 4-ethylsulfonyl-2-nitro-N,N-dimethyl benzamide, 6-ethylsulfonyl-2-nitro-N,N-dimethyl benzamide and 6-ethylsulfonyl-2-nitro-N,N-diethyl benzamide.

A still further preferred subclass because of their herbicidal properties are the benzamides represented by the formula:

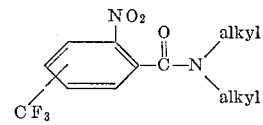

wherein alkyl contains 1 to 3 carbon atoms. 6-trifluoromethyl-2-nitro-N,N-dimethyl benzamide, 4-trifluoromethyl-2-nitro-N,N-dimethyl benzamide and 4-trifluoromethyl-2-nitro-N,N-diethyl benzamide are examples of such compounds.

Still another preferred subclass of active herbicides are those compounds represented by the formula:

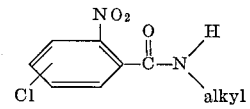

wherein alkyl contains 1 to 3 carbon atoms. Such compounds are represented by 4-chloro-2-nitro-N-methyl benzamide and 6-chloro-2-nitro-N-methyl benzamide.

The 2-mononuclear substituted alkyl and alkoxy benzamides may be readily prepared by the reaction of the appropriate nuclear substituted 2-nitrobenzoic acid with a chlorinating agent which in turn is reacted with an alkylamine or an alkoxyamine.

The following examples are presented to show how the compounds of the invention can be prepared and to illustrate their effectiveness as herbicides.

In the following examples, the parts given are parts by weight otherwise noted.

EXAMPLE I.—PREPARATION OF 4-CHLORO-2-NITRO-N,N-DIMETHYL BENZAMIDE 44 parts of 4-chloro-2-nitrobenzoic acid was added to 100 parts of thionyl chloride and refluxed for two hours. 150 parts of benzene was next added and the solution was evaporated to yield 46 parts of a dark oil. This product was distilled and the fraction with a boiling point of 129–130° C. at 1 mm. was dissolved in benzene and dimethylamine was passed through the solution for one hour at room temperature. A yellow solid was isolated and after water washing had a melting point of 85–86° C. and was obtained in 95% yield. The structure was confirmed by infra-red and elemental analysis. Elemental analysis are given in percent by weight, viz.:

Calc'd for $C_9H_9N_2O_3Cl$: N, 12.3; Cl, 15.5. Found: N, 12.3; Cl, 15.5.

EXAMPLE II.—PREPARATION OF 4-CHLORO-2-NITRO-N,N-DIETHYL BENZAMIDE

In a manner similar to that described in Example I, the reaction product of 4-chloro-2-nitrobenzoic acid and thionyl chloride was reacted with diethylamine. 4-chloro-2-nitro-N,N-diethyl benzamide M.P. 64–67° C. was obtained in 80% yield. The structure was confirmed by elemental and infra-red analysis. Elemental analysis are given in percent by weight, viz.:

Calc'd for $C_{11}H_{13}N_2O_3Cl$: N, 10.9; Cl, 13.8. Found: N, 11.2; Cl, 14.0.

EXAMPLE III.—PREPARATION OF 4-BROMO-2-NITRO-N,N-DIMETHYL BENZAMIDE

In a manner similar to that of Example I, 4-bromo-2-nitrobenzoic acid was refluxed with thionyl chloride for 20 hours and after distillation and clean-up 25% aqueous dimethylamine was added to the reaction product over a 45 minute period. 70% of 4-bromo-2-nitro-N,N-dimethyl benzamide, M.P. 104–106° C., was obtained. The structure was confirmed by infra-red and elemental analysis. Elemental analysis is given in percent by weight viz.:

Calc'd for $C_9H_9N_2O_3Br$: N, 10.3; Cl, 29.3. Found: N, 10.5; Cl, 29.1.

EXAMPLE IV.—PREPARATION OF 4-CHLORO-2-NITRO-N-METHOXY,N-METHYL BENZAMIDE 39 parts of the reaction product of 4-chloro-2-nitrobenzoic acid and thionyl chloride, as prepared in Example I, was added dropwise to 21 parts of O,N-dimethylhydroxylamine with 150 parts of water and 41 parts of sodium carbonate. The solid obtained was water washed and extracted with benzene. A 42% yield of 4-chloro-2-nitro-N-methory,N-methyl benzamide, M.P. 90–93° C., was obtained. The structure was confirmed by elemental analysis and is given in percent by weight, viz.:

Calc'd for $C_9H_9N_2O_3Cl$: N, 11.4; Cl, 14.5. Found: N, 11.8; Cl. 14.7.

In a similar manner the herbicidal 4-chloro-2-nitro-N,N-dimethoxy benzamide and 4-chloro-2-nitro-N,N-diethoxy benzamide are prepared.

EXAMPLE V.—PREPARATION OF 2-CHLORO-6-NITRO-N,N-DIMETHYL BENZAMIDE

Six parts of 2-chloro-6-nitrobenzoic acid in 50 parts of toluene by volume was reacted with 10 parts of thionyl chloride by volume, and the resultant 2-chloro-6-nitrobenzonyl-chloride was reacted with an excess of dimethylamine to give a 59% yield of 2-chloro-6-nitro-N,N-dimethyl benzamide, M.P. 88–92° C. The structure was confirmed by elemental and infra-red analysis and the elemental is given in percent by weight, viz.:

Calc'd for $C_9H_9N_2O_3Cl$: N, 12.2; Cl, 15.5. Found: N, 12.9; Cl, 15.4.

EXAMPLE VI

The pre-emergence herbicide astivity of the compounds of the invention was evaluated by planting weed seeds in soil treated with the candidate herbicides at the rate of 10 pounds per acre. Seeds of watergrass (*Echinochloa crusgalli*) and cress (*Lepidium sativum*) were germinated in treated soil under controlled conditions of temperature and light for 10–11 days prior to evaluation of the effectiveness of the treatments. At this time, the germination was noted and the treatments were rated on a 0 (no effect) to 9 (all dead or no growth) scale. The results are summarized in Table I.

TABLE I.—PRE-EMERGENCE SOIL HERBICIDE TESTS

| Test compound | 10 lbs./acre watergrass | 10 lbs./acre cress |
|---|---|---|
| 4-chloro-2-nitro-N,N-dimethyl benzamide | 9 | 9 |
| 4-chloro-2-nitro-N,N-diethyl benzamide | 8 | 9 |
| 4-bromo-2-nitro-N,N-dimethyl benzamide | 9 | 9 |
| 4-chloro-2-nitro-N-methoxy,N-methyl benzamide | 9 | 9 |
| 6-chloro-2-nitro-N,N-dimethyl benzamide | 9 | 9 |
| 6-chloro-2-nitro-N-methyl benzamide | 9 | 9 |
| 4-chloro-2-nitro-N-methyl benzamide | 7 | 9 |

EXAMPLE VII

The post-emergence herbicide activity of the compounds of the invention was evaluated by spraying dilute suspensions of the compounds in a 1:1 mixture of acetone and water with 0.5% wetting agent on crabgrass (*Digitaria sanguinalis*) and pigweed plants (Amaranthus sp.) grown under controlled conditions. After the plants were held for 10–11 days, they were rated for treatment effect on a 0 (no effect) to 9 (total plant kill) scale. The results are set forth in Table II.

TABLE II.—POST-EMERGENCE SPRAY HERBICIDE TESTS

| | Weed control rating | |
|---|---|---|
| Test compound | 10 lbs./acre crabgrass | 10 lbs./acre pigweed |
| 4-chloro-2-nitro-N,N-dimethyl benzamide | 9 | 9 |
| 4-chloro-2-nitro-N,N-diethyl benzamide | | 9 |
| 4-bromo-2-nitro-N,N-dimethyl benzamide | 9 | 9 |
| 4-chloro-2-nitro-N-methoxy,N-methyl benzamide | 9 | 9 |
| 6-chloro-2-nitro-N,N-dimethyl benzamide | 9 | 9 |
| 4-chloro-2-nitro-N-methyl benzamide | | 9 |

EXAMPLE VIII

In still further herbicide tests with the benzamides of this invention, duckweek (*Lemna minor*) and cheatgrass (*Bromus tectorum*) were grown in sterile plant nutrient solution and the candidate test compounds were added to the solution at the rate of 10 parts per million. The plants were held in the treated solutions for 10 to 11 days under controlled conditions of light and temperature. At the end of this period, estimates of growth were made on a 0 (no effect) to 9 (all dead) scale.

TABLE III. Solution Herbicide Tests

| | Weed control rating | |
|---|---|---|
| Test control | 10 p.p.m. cheatgrass | 10 p.p.m. duckweed |
| 4-chloro-2-nitro-N,N-dimethyl benzamide | 9 | 8 |
| 4-bromo-2-nitro-N,N-dimethyl benzamide | 9 | 8 |
| 4-chloro-2-nitro-N-methoxy,N-methyl benzamide | 7 | 8 |
| 6-chloro-2-nitro-N,N-dimethyl benzamide | 6 | |

One advantage of the benzamide herbicides of this invention is that they are not very volatile, and tend to remain in that part of the soil into which they are introduced; some may be moved through the soil by water. Consequently, by appropriate selection of the part of the soil into which they are introduced relative to the seeds of wanted plants and those of unwanted plants, and taking into account the effect of water, these herbicides can be used to prevent all plant growth, even at relatively low dosages in some cases, or their selectivity can be improved to prevent growth of unwanted plants without harm to wanted plants. For example, as is well known, only those weed seeds which are present within about one-quarter inch of the surface of the soil will germinate, whereas the seeds of cereal, and other crops, for example, ordinarily are sown about one-half to three-quarters of an inch below the surface of the soil, and germinate well under these conditions. By introducing the herbicide only into the top one-quarter inch of the soil, and avoiding excessive watering, germination of the weed seeds can be prevented, while germination of the crop seeds will not be effected. Thus, even those herbicides of this invention that are not very selective in their action can be used to selectively remove weeds from cereal grains or other crops. Of course, if complete kill of all plants in a given portion of soil is desired, it is necessary only to introduce one or more of the benzamide herbicides throughout that portion of soil.

The benzamides are soluble in the common organic horticultural solvents. Thus, according to the intended method of application, the character of the plants involved, and the concentration of herbicide to be used, the herbicidal benzamides can be formulated as a solution or suspension in water, or a suitable organic solvent, as a dispersion or emulsion of the active agent in a non-solvent therefore, as an emulsion of a solution of the active agent in a suitable solvent emulsified with a second, inhomogeneous liquid, or as a solid comprising the active agent or agents sorbed on a sorptive solid carrier.

When a light hydrocarbon oil is to be used as carrier, suitable materials for the purpose include any of the spray oil marketed commercially for this purpose. The highly aromatic hydrocarbons are preferred. Thus, highly refined aromatic hydrocarbons, such as benzene, toluene, xylene, ethylbenzene, cumene or isodurene, may be used, or the carrier may be a less highly refined relatively aromatic hydrocarbon mixture, such as a coal air fraction, a straight-run petroleum distillate, a thermally or catalytically cracked hydrocarbon oil, platformate, or the like. Suitable solvents may also comprise a relatively aliphatic hydrocarbon material, or mixtures of aromatic and aliphatic hydrocarbons. Suitable aliphatic hydrocarbon materials include refined gas oil, light lubricating oil fractions, refined kerosene, mineral seal oil and the like. Spray oils boiling in the range of from 190° C. to 300° C. are suitable, as are spray oils boiling in the range of from 300° C. to 540° C. and having an unsulfonatable residue of at least 75%. Mixtures of such spray oils also may be used.

Although the solvent usually will be of mineral origin, animal or vegetable oils as well as synthetic solvents also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier.

Solutions of the active agents may be applied as such to the plants or to the soil that is to be treated, or they may be suspended in water and suspension or emulsion applied to the plants or soil. Thus, a relatively concentrated solution of the active agent in a water-immiscible solvent may be prepared, with added emulsifying, dispersing or other surface-active agents, and the concentrate diluted in the spray tank with water to form a uniform fine emulsion which can be applied by conventional spray devices. Emulsions or dispersions of the active agents as such in water may also be prepared and applied.

Suitable emulsifiable concentrates, adapted for dispersion in water to provide a sprayable composition, ordinarily will contain between about 5% by weight and about 50% by weight of active agent dissolved in a hydrocarbon or other suitable water-immiscible solvent. Minor amounts for example, about 0.5% by weight to about 10% by weight, of emulsifying agents may be included to promote dispersion of the concentrate in water. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation active wetting and emulsifying agents may be used for this purpose, the non-ionic agents are preferred since the concentrates in which they are present have increased stability and do not suffer phase separation when diluted with hard water. Suitable non-ionic agents which may be used are available commercially as condensation products of alkylphenols with ethylene oxide and condensation products of ethylene oxide and higher fatty acid esters, for example, oleic acid ester of anhydrosorbitols.

Liquid compositions of these herbicidal benzamides suitable for application to plants or to their environment contain the active agent or agents in concentrations generally within the range of from about 0.01% by weight to about 50% by weight.

The invention includes novel solid compositions of matter wherein the active agent or agents are absorbed or adsorbed in or on a sorptive carrier, such as finely divided clay, talc, gypsum, lime, wood flour, fuller's earth, keiselguhr, or the like. The solid composition, or dust, may contain from as little as 1% by weight of active material to 75% by weight of active material, or even more. It may be prepared as a dust, or as granules designed to be broadcast or to be worked into the soil. Compositions formulated as wettable powders are particularly suitable. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.1 to 30 or more pounds per acre. It will be appreciated that the rate of application is subject to variation according to the particular active agent used, the particular species of plants involved, and the local conditions, for example, temperature humidity, moisture content of the soil, nature of the soil, and the like. Effective resolution of these factors is well within the skill of those well versed in the herbicide art.

The herbicidal compositions may contain one or more of the herbicidal benzamides set out hereinbefore as the sole active agent, or they may contain in addition thereto other biologically active substances. Thus, insecticides, e.g., DDT, endrin, dieldrin, aldrin, chlordane, demeton, methoxychlor, DDVP, naled, parathion and other organophosphorus insecticides, rotenone and pyrethrum, and fungicides, such as copper compounds, ferbam, captan, and the like, may be incorporated in the compositions. Further, if desired, the herbicidal compositions may contain fertilizers, trace metals, or the like and when applied directly to the soil may additionally contain nematocides, soil conditioners other plant regulators, such as naphthalene acetic acid, 2,4-dichlorophenoxyacetic acid and the like, and/or herbicides of different properties.

We claim as our invention:

1. The compound of the formula:

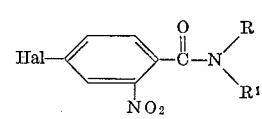

wherein R is alkyl of 1 to 3 carbon atoms, R¹ is alkyl of 1 to 3 carbon atoms and Hal is chlorine or bromine.

2. The compound of

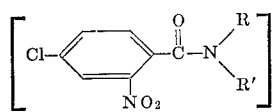

3. The compound of the formula:

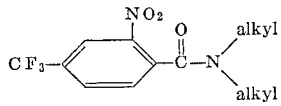

wherein alkyl contains 1 to 3 carbon atoms.

4. The compound of the formula:

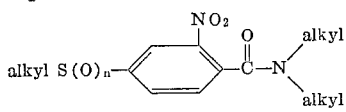

wherein alkyl contains 1 to 3 carbon atoms and $n=0$–$2$.

5. 4-chloro-2-nitro-N,N-dimethylbenzamide.
6. 4-chloro-2-nitro-N,N-diethyl benzamide.
7. 4-bromo-2-nitro-N,N-dimethyl benzamide.

References Cited

UNITED STATES PATENTS

| | | | |
|---|---|---|---|
| 3,187,042 | 6/1965 | Richter | 260—558 |
| 3,187,001 | 6/1965 | Meyer et al. | 260—558 XR |

FOREIGN PATENTS

| | | |
|---|---|---|
| 903,404 | 1962 | England. |
| 6,408,290 | 1/1965 | Netherlands. |

OTHER REFERENCES

Ball et al., Nature, 199, p. 612, Aug. 10, 1963.
Heller, Ber, 49, p. 545, 1916.

HENRY R. JILES, Primary Examiner

H. I. MOATZ, Assistant Examiner

U.S. Cl. X.R.

71—118; 260—453, 470, 471